Sept. 12, 1961  F. FAULHABER  2,999,436
PROCESS AND DEVICE FOR AUTOMATICALLY
ADJUSTING OPTICAL INSTRUMENTS
Filed Sept. 1, 1955  6 Sheets-Sheet 1

Inventor
FRITZ FAULHABER

BY Mock & Blum

ATTORNEYS

Inventor
FRITZ FAULHABER

FIG.18

United States Patent Office 2,999,436
Patented Sept. 12, 1961

2,999,436
PROCESS AND DEVICE FOR AUTOMATICALLY ADJUSTING OPTICAL INSTRUMENTS
Fritz Faulhaber, Schonaich, Bezirk Boblingen, Germany, assignor to Voigtländer, A.G., Braunschweig, Germany, a corporation of Germany
Filed Sept. 1, 1955, Ser. No. 532,020
Claims priority, application Germany Sept. 4, 1954
14 Claims. (Cl. 95—10)

This invention relates to a method and device for automatic sharp focusing of optical devices, particularly in in photographic cameras.

In carrying out the invention, intermittent light is supplied through a moving diaphragm to a photoelectric means or member.

In the development of photographic devices for taking pictures, automatic control of operation has been increasingly preferred. This has been true not only in connection with complicated devices, such as tele-cameras, but also in connection with cameras used by amateurs. In the course of this development, a fully automatic control of sharp focusing, i.e. an optical system or device which fully automatically sharply adjusts itself to the selected object to be photographed, at a plurality of the available possibilities from which such selection has been made, represents one of the most difficult problems to be solved.

Attempts to provide, by purely optical means, an optical system which would render steps for sharp focusing unnecessary, cannot be expected to meet all requirements, for reasons of a physical nature. It may be that such optical systems will have some utility in the field of cinema photography, but they could not meet the necessary requirements needed in taking absolutely accurate and very sharp pictures with miniature cameras.

All processes hitherto known for the objective sharp focusing of images resulting from optical systems, are concerned with the adjustment and examination of objectives in the manufacturing industries. In one of these processes, for example, a device with auto-collimation is used, in which the adjustment of an objective to the optimum sharpness of the image is effected by a photo-electric cell arranged in front of the ocular of the auto-collimator, or replacing the ocular. In this arrangement, light obtained from a light source is projected to the light-sensitive surface of said cell by the objective to be examined, after penetration through two test objects arranged in two nodal points of the rays or after two repeated penetrations through one test object arranged in one nodal point of the rays. At exact coincidence of the two test object images, a maximum or minimum of the photoelectric current results, which is used as a criterion for the adjustment of the objective. As a further simplification, the photoelectric current can be used for controlling a device which automatically effects sharp focusing, for example by means of a motor.

Furthermore, a testing or measuring method has been suggested, in which the optical test images do not remain in a state of rest and the bright and dark fields of a screen-like test object image are projected to the photoelectric member alternately and in quick succession through a slit diaphragm, so that alternations of the photoelectric current are obtained.

In all these cases screen-like or test objects and test images are used, which have distinct edges between the bright fields and dark fields and correspondingly large contrasts of light. However, in practical photography the objects, as a rule, do not have such sharp subdivisions. As a rule, in practical photography adjacent elements of the image are either poor in detail and contrasts, e.g. in portraits or the details are of extremely fine character, e.g. in pictures of a remote landscape. The contrasts are mostly shaded and rarely extend along distinct edges. In addition, the dimensions in space should be taken into consideration by adjustment of the depth of focus. It is, of course, desirable that sharp focusing of the objective in daily use should yield an optimum sharpness of the image in all cases. Sharp focusing should be obtainable not only in the case of objects at a predetermined distance, e.g. in the case of portraits, but also in the case of landscapes with mountains in the background, a few houses in the central field of vision and some trees or branches in the foreground.

Thus, in addition to the adjustment of the objective an automatic sharp focusing system must be capable of taking care of additional adjustments, such as, for example, adjustment of the depth of focus.

From the foregoing discussion of known devices and methods for sharp focusing, it is believed that it will be clear that these known devices and methods will not provide both the automatic sharp focusing and automatic adjustment of the depth of focus which is highly desirable in every day use of an amateur, motion-picture, or tele-camera.

The present invention relates to a fundamentally novel method and device. Its main object is to provide a method and means for fully automatic sharp focusing of an optical device to any object whereby, by automatic variation and comparison of the frequencies obtained in the photoelectric current, control currents are obtained which bring about adjustment of the device with optimum sharpness.

For the sake of clearness, in the following disclosure and diagrammatical illustration of the invention in the appended drawings, certain simplifications have been made which facilitate the disclosure and understanding of the invention, but do not affect the fundamental mode of operation thereof. In the drawings:

FIG. 18 is a schematic wiring diagram of the control system embodying the invention;

Figure 1:
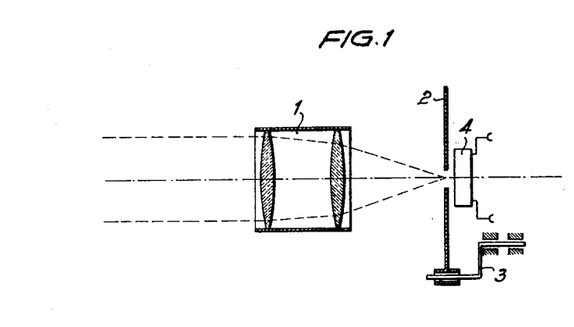
FIG. 1 is a diagrammatic illustration of an oscillatable slit diaphragm for periodically interrupting the light incident upon a photocell.
Figure 1B:
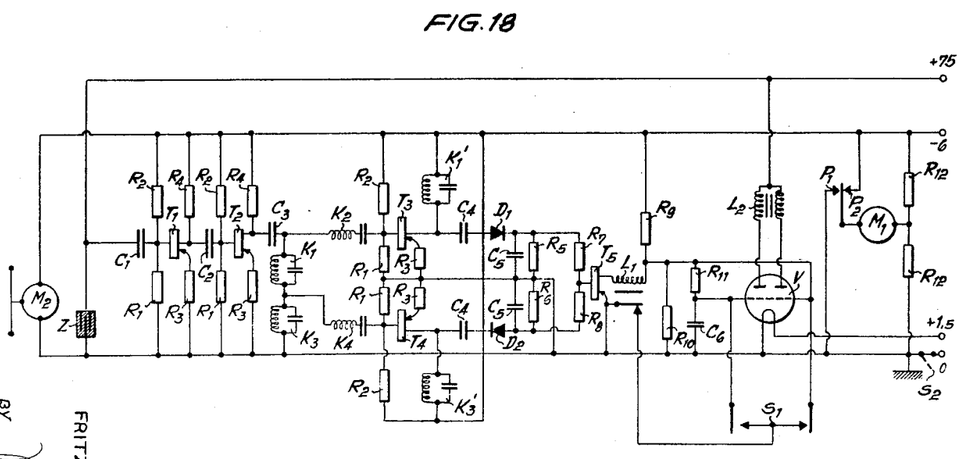

In the arrangement shown in FIGURE 1, the light rays corresponding to an image and being incident through objective 1, are united in the plane of a slit diaphragm 2, to form an image. Through slit diaphragm 2, to which a swinging movement is imparted, for example, by means of a crank gear 3, the light falls intermittently on a photo-electric cell 4. Instead of carrying out a movement to and fro, the diaphragm may be caused to rotate, with the same effect. Depending on the amount of light incident on photo-cell 4, a correspondingly varying electric voltage or electric current is formed in the photo-cell.

The greater the differences in the amounts of light incident through the slit diaphragm are, the greater will be the difference in the current impulses supplied from the photo-cell and thus the greater will be the differences in the amplitudes of the latter.

Figure 2:
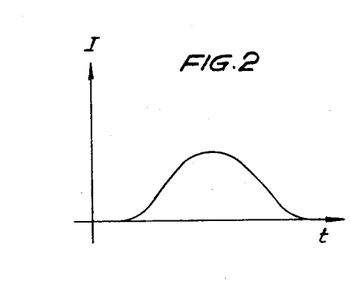
FIGS. 2 and 3 are graphs illustrating the form of the output current curve of the photocell of FIG. 1.
Figure 3:
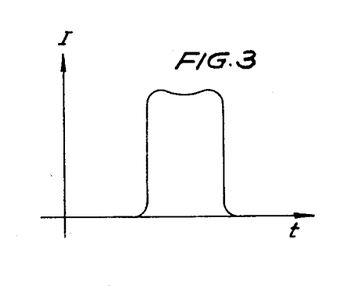

Thereby, the image sharpness in the plane of the diaphragm determines the width of the transition interval of the current impulses, because the differences in brightness change suddenly at optimum sharpness of the image, while at nonsharp focusing of the image they take place more gradually. Thus, for example, if the image of optimum sharpness is located somewhat before, or somewhat behind the plane of diaphragm 2, the image in the plane of the diaphragm will be more or less lacking in sharpness. Therefore, the boundary lines between the brighter and darker portions of the image will appear blurred due to the presence of transition zones and, at the output of photo-cell 4, current impulses are obtained, the shape of which is similar to that indicated in FIGURE 2. If, however, a sharp image is located directly in the plane of the slit diaphragm, current impulses having the shape shown in FIGURE 3 will be obtained at the output of the photo-cell.

Figure 4:
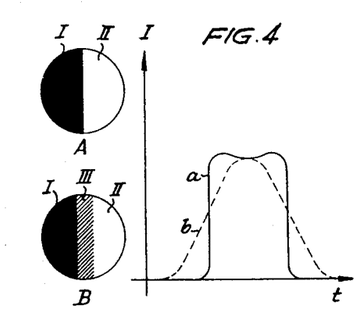
FIGS. 4 and 5 are graphs illustrating such output current curve under different conditions of the degree of contrast between light and dark areas of the object.
Figure 5:
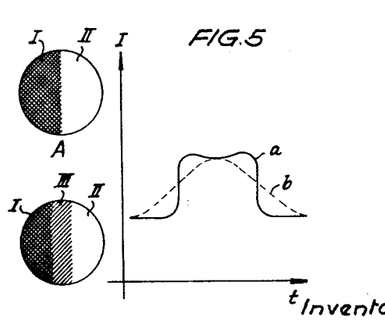

The above situation is diagrammatically illustrated for the sake of clarity in FIGURE 4 in the case of image elements which are rich in contrasts and in FIG. 5 in the case of image elements which are relatively poor in contrasts. In both cases, sharp focusing is shown at A and nonsharp focusing at B. If the slit diaphragm 2 (see FIG. 1) passes during sharp focusing from dark field I to bright field II over a sharp separating edge (case A), current impulses similar to curves *a* are produced. In the case of nonsharp adjustment (case B), the diaphragm passes between dark field I and bright field II through an intermediate zone III, whereby the course of the current produced will be similar to curves *b* shown in dotted line. It will be understood from FIGURES 4 and 5, that the shape of curves *a* and *b* depends merely on the sharp focusing of the image in the plane of the slit, while the variation of contrasts between image elements affects only the amplitude.

According to Fourier's principle, the current curves *a* contain a greater number of harmonics than the curves *b* and the frequency mixture present in the photo-current will show differences, depending on the adjustment of the image to the plane of the diaphragm 2, by the objective 1.

Figure 6:
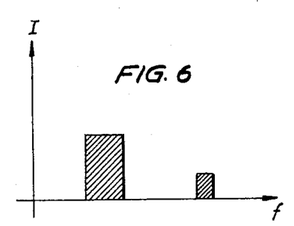
FIGS. 6, 7, and 8 are graphs illustrating the frequency bands obtainable with the arrangement of FIG. 1.

In the case of nonsharp adjustment (see FIG. 2 and curves *b* of FIGS. 4 and 5) the frequency mixture will contain substantially more frequencies of greater amplitudes in the lower frequency ranges than in the higher frequency ranges. Now, it has been known that predetermined frequencies, or frequency bands, can be removed from a frequency spectrum by conventional means, e.g. electric filters. In the present case conditions result which essentially correspond to the diagrammatic illustration of FIGURE 6.

Figure 7:
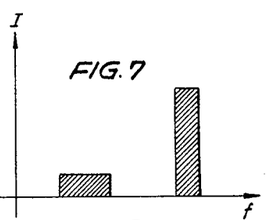

On the other hand, in the case of sharp focusing (see FIG. 3 and curves *a* of FIGS. 4 and 5) the frequency spectrum will contain small proportions of low frequencies and high proportions of high frequencies. After separation of two bands, substantially the conditions diagrammatically illustrated in FIG. 7 would result.

Objects to be photographed in practical photography will seldom contain black-white maximum contrasts with smooth sharp edges. However some contrasts and edges can be found in every image. Therefore, by its movements relative to the photo-cell the swinging diaphragm always will produce a maximum of high frequencies when the image of an object is sharply formed therein, whereby, however, the absolute values of the frequencies may considerably differ from each other. Objects to be photographed which are rich in contrasts, yield upon sharp focusing frequency bands according to FIG. 7, while objects which are poor in contrasts yield frequency bands corresponding to FIG. 8. Thus, the absolute values of the high and low frequencies depend on the degree of contrasts (black-white), as well as on the transition conditions between the contrasts (sharp edges or blurred edges). However, their mutual proportion can be considered practically constant.

In the analysis of the diagrammatical illustrations of FIGS. 2–8, arbitrarily only two frequency bands have been chosen at random from the continuous frequency spectrum and the fundamental frequency which corresponds to the diaphragm frequency and may be in some cases of a remarkable magnitude and, if necessary, compensated in conventional manner, e.g. by means of an additional photo-cell illuminated by diffused light, has been omitted.

It will be clear from the foregoing that it is only necessary to properly inter-relate the high and low frequencies, which differ in accordance with the image content, in order to obtain an exact criterion for sharp focusing.

Such "relative analysis of frequencies" can be carried out in a relatively simple manner. An electrical system suitable for this purpose is shown as a block diagram in FIG. 9. The frequency mixture supplied by the photo-cell 4, is first amplified in amplifier 5 and then separated into high and low frequencies by the filters 6 and 7. The pass ranges and widths of the filter are selectively in conformity with the frequency bands selected for the relative analysis of frequencies in such a manner that, for example, only the band of high frequencies can pass through filter 6 and only the band of low frequencies can pass through filter 7. Thereby, according to the invention additional control elements can be provided, which have the effect of causing the filters to rhythmically shift within certain limits with their band widths maintained constant, a procedure which, in connection with transmitters, is denoted "wobbling."

Figures 8, 9:
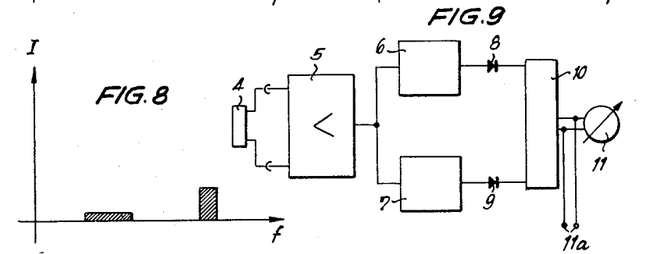
FIG. 9 is a schematic block diagram of a frequency analyzing system.

The two filtered frequency bands are conducted along separate paths through the rectifiers 8 and 9 to a component 10, which acts as a "quotient former" for example in such a manner that the high frequencies arriving therein through rectifier 8 are amplified, with the degree of amplification being controlled by the low frequencies passing through rectifier 9. Thereby conventional annular modulators can also be used. At the output of amplifier 10 a current is obtained, the intensity of which corresponds to the relation between the high and low frequencies. Thus, an instrument 11 connected with amplifier 10 will always show the greatest deflection when the image incident on the diaphragm is of maximum sharpness.

This maximum current indicated in instrument 11 is practically independent of the brightness of the image, the degree of contrasts, and the contrast transitions in the object to be photographed, because it is derived from the ratio of filtered frequencies, which always remains pratically constant. It can be used, if desired after further amplification, for controlling in conventional manner an adjusting motor for adjusting the objective of the camera.

The device denoted "maximum finder" and described hereinafter can be used according to the present invention with particular advantage for driving or controlling the adjusting motor by the current indicated by instrument 11.

This device essentially consists of a mechanical operating or driving gear and electrical switching elements for the control current. An embodiment of the mechanical structure is diagrammatically shown, by way of example, in FIG. 10. The objective 1 is seated on a slide 12, which can be displaced by means of a rack 13 and a pinion 14 by the action of reversing motor 15. It is assumed that the rest position of the slide 12 is one of the limits of adjustment of the objective, for example its infinite position. After taking a picture, the objective should always automatically return to this rest position.

Figure 10:
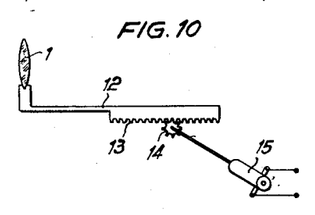
FIG. 10 is a somewhat schematic illustration of mechanical means for effecting adjustment of the depth of focus.

If a picture is to be taken, it is only necessary to direct the camera to the object to be photographed and actuate, for example, a starting button which causes the individual steps of the adjusting procedure to take place fully automatically. It is assumed that the motor 15 starts to run at the occurrence of the starting signal and causes displacement of the objective from its infinite position to the position of 1 m. During this first tentative adjustment of the objective 1 from the infinite to the 1 m. position, the hereinafter described device for sharp focusing is switched off or disconnected. This step is taken in view of the requirement that, in the case of two or more objects to be photographed, the depth of focus should be also automatically adjusted, by a procedure described hereinafter.

Figure 11:
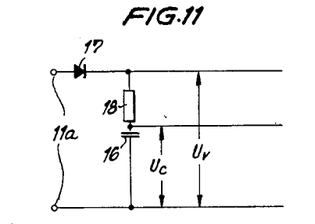
FIG. 11 is a schematic wiring diagram illustrating a portion of the control circuit of the invention.
Figure 12:
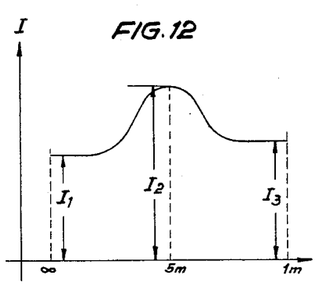
FIG. 12 is a graph illustrating the form of the output current of the analyzer of FIG. 9.

The current values indicated by instrument 11 will vary in a manner similar to the curve depicted in FIG. 12. First, the current will have a value $I_1$, which corresponds to a steady current which, if desired, can be compensated for. As the objective moves toward the object to be photographed—which is assumed to be located at a distance of 5 m. in this example—the current will increase and attain its maximum $I_2$ at the objective position of 5 m., whereupon it will decrease again to a current $I_3$, or to the steady current. If subsequently the objective is moved again from the distance of 1 m. in the direction of the infinite position, the current values will follow the curve indicated in FIG. 12 in the opposite direction. Its maximum $I_2$ will still be located at 5 m. The electric device diagrammatically shown in FIG. 11 is now switched on and will start to operate.

Figure 13:
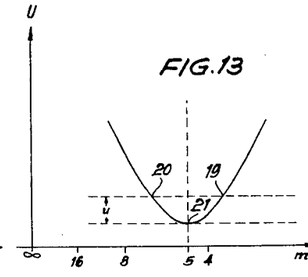
FIG. 13 is a graph illustrating a shape of the control voltage curve.

In FIG. 11 reference symbol 16 denotes a condenser which is charged through a rectifier 17 by the voltage $U_v$ at 11a (see also FIG. 9). As a resistance 18 is arranged in series with the condenser 16, the voltage $U_c$ at the condenser will, when current flows through 16, be less than the charging voltage $U_v$. This difference between $U_v$ and $U_c$ is dependent on the time constants of the electric arrangement 16—18 and can be selected in such a manner that it becomes exceedingly small upon the current reaching the maximum at terminals 11a. Thus, a current difference ($U_v - U_c$), corresponding approximately to the curve of FIG. 13, will be obtained. As control voltage for an adjusting motor, the difference $U_v$ minus $U_c$ will stop the motor when the photocell output current is a maximum. In order to carry out adjustment by the motor as exactly as possible and to compensate running over, which may occur as an effect of forces due to inertia, it is particularly advisable to use a reversing motor. By co-operation with conventional electrical and mechanical drag links, for example by allowing the motor to oscillate around the point of adjustment, it can be attained that exact adjustment of any desired accuracy at the voltage minimum of the difference $U_v$ minus $U_c$, or at a maximum at terminals 11a, which is practically the same, occurs. In FIG. 13, for example a small voltage difference range $u$ is assumed, which is selectively adjustable or can be chosen as the apparatus constant, within the limits of which the control voltage on the curve section 19, 21, 20 decreases and increases, in order to reverse the motor in each case at points 19 and 20. In this manner the motor will oscillate to and fro, in correspondence with the path 19, 20, around the actual point of adjustment 21 of the sharp focusing.

If the steady current mentioned above in the description of the current variation according to FIG. 12, is not compensated for, the adjusting device would be disconnected or switched off during its passing through the adjusting range for the first time, because in this case the voltages $U_v$ and $U_c$ would be equal. It is, therefore, essential that, during the first passage of the objective through its adjustment range between infinite and 1 m. for the sake of orientation, the control device according to FIG. 11 be disconnected. During the second passage it can be then attained that the adjusting device is oscillated a limited amount about the transition point 21.

Thus, the above description relates to the fully automatic sharp focusing of optical devices in cases in which there is only one object to be photographed at a certain distance.

However, in practical photography it will be frequently necessary that several objects to be photographed, which are located at varying distances from the photographic objective, be sharply reproduced in the image. In such cases it is necessary to adjust the depth of focus too, and this adjustment also is carried out automatically according to the present invention.

It is assumed that there are several objects to be photographed, which are located at varying distances relative to the photographic camera and exhibit differences in brightness, for example along more or less irregular edges, said differences in brightness causing the occurrence of a corresponding number of maxima or minima in the control current, in the above described manner. In such a case only the two maxima which are located at the utmost outer parts on the right and on the left (and correspond to the objects located at the utmost outer parts on the right and on the left in the image) have to be taken into consideration, as illustrated in FIG. 14.

Figure 14:
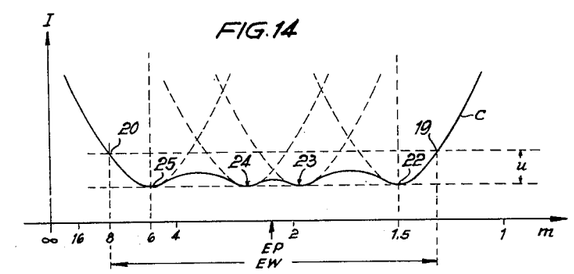
FIG. 14 is a graph, similar to FIG. 13, illustrating the control voltage curve with more than one object in the field to be photographed.

In FIG. 14 four objects considered in the automatic sharp focusing are assumed, which are located at varying distances relative to the photographic objective. It is further assumed that the current impulses, produced by these objects in the photoelectric organ by means of the swinging diaphragm, have been already taken care of in the manner described above by the "relative analysis of frequencies" and the "maximum finder." Therefore, they occur as practically uniform voltage troughs, in analogy to FIG. 13. Starting from the right end of curve $c$ illustrating the adjustment of the depth of focus, the following can be observed: The curve first descends to a minimum 22, which corresponds to sharp focusing of an object to be photographed at a distance of 1.5 m. The minima 23 and 24, which may correspond to two objects of a distance of 2 m. and 2.5 m., cause—although they are as sharply marked as the minimum 22—only a certain undulation of the curve $c$. Beyond the minimum 25, which is at the utmost left and is caused by an object located at a distance of 6 m., the voltage curve $c$ ascends again. By the use of suitable means, which for the sake of simplicity may be similar to those described in connection with FIG. 13, here again a small voltage $u$ is provided, within the range of which undulation of the curce $c$, resulting from intermediate minima 23 and 24, is located, so that the range of movement of the objective shown at EW extends from point 19 to point 20. The objective is oscillated through this range by the motor and the motor and thereby sharply adjusts the objective to the center, i.e. to the adjustment point EP, again over some drag links. Simultaneously, the oscillation of the objective through its range (EW) is transmitted, for example, over a rack or a worm gear drive, to the objective diaphragm which will be narrowed in inverse portion to the distance between the adjustment points (22 and 25, and 19 and 20, respectively). In this manner the sharp focusing with the necessary depth of focus, is adjusted fully automatically.

The present invention also relates to the automatic adjustment of the light value, corresponding to its magnitude as well as to its combination. The term "adjustment according to the magnitude of the light value" denotes here an adjustment corresponding to the prevailing light conditions. The term "adjustment of the light value according to combination" denotes regulation of the relation of the diaphragm aperture and the time of exposure in their mutual dependence.

Adjustment of the light value is effected by a second diaphragm. The latter is distinguished from the swinging diaphragm for sharp focusing in that it consists of alternating nontransparent sections and dull, light-diffusive sections. It can be caused to move, in the same manner as the other diaphragm, in front of a photoelectric organ, for example, to swing to and fro or to rotate. The light incident on the diaphragm, for example through the objective, is either cut off by the nontransparent part, or passes as diffused light through the dulled portion onto the photocell, depending on the momentary position of the diaphragm. Thereby, a pulsating direct current of corresponding amplitude is generated in the photo-cell formed, in conformity with the amount of the incident light and, therefore, also in conformity with the light conditions in the space where the picture is taken. If this space is brightly illuminated, a large amount of light will reach the photo-cell and the amplitude of the pulsating photo-direct current will be of a corresponding magnitude. If said space is illuminated less brightly, the current amplitude will be correspondingly smaller. These currents, which are of varying intensity in dependence on the prevailing light conditions, are treated in an electric system or arrangement similar to that described above for the channel of sharp focusing, i.e. they are amplified, filtered, etc. and utilized for effecting adjustment of the light value, for example by means of a magnetic coupling. The proper light value can be determined and adjusted either separately and directly at the start of the automatic adjustment steps in the optical device, or it can be determined and adjusted conjointly with the adjustment of the exposure time, whereby it is super-imposed in a certain sense on this latter operation.

Figure 15:
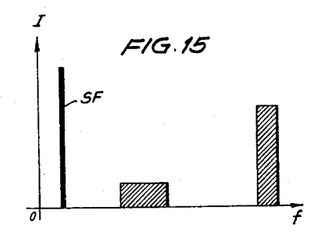
FIG. 15 is a graph, similar to FIG. 7, illustrating the frequencies obtained in adjusting for the light value.

The fundamental frequency of the swinging diaphragm, denoted SF in FIG. 15, does not disturb the frequencies filtered for the other adjusting steps, because the latter are, in general, substantially lower than the other control frequencies. This is made clear by a comparison of FIG. 15 with FIG. 7.

Each of the two moving diaphragms, one of which serves as slit diaphragm for producing the control currents for sharp focusing, while the other of which serves as a frosted glass diaphragm for controlling adjustment of the light value, may be co-ordinated with a photoelectric organ. The currents produced in the two photo-elements can be amplified and analysed in two separate channels, until they are suitable for the above described control steps. However, two such channels would include components, or even banks of components, such as amplifiers, filters, contact banks, and others, which are very similar to each other, or are even identical. In order to keep the necessary structure or construction as small as possible, it is contemplated according to the present invention to cause the two diaphragms to swing alternately over the same photoelectric organ and to process the coordinated photo-currents by suitable actuation of contacts in the same channel, if desired with switching off or switching on certain selected steps or phases.

Figure 16:
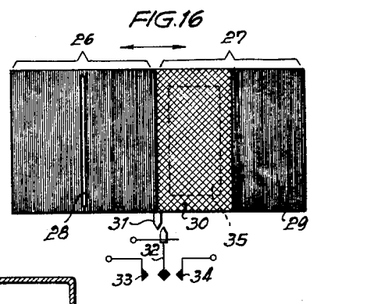
FIG. 16 is a plan or elevation view of two interconnected diaphragms movable as a unit, one for adjusting the focusing of the camera and the other for adjusting for the light values.

FIGURE 16 illustrates two connected diaphragms 26 and 27, which are caused to move to and fro over a photocell 35. Diaphragm 26 is a slit diaphragm having a narrow slit 28 and, during its passage over photo-cell 35, controls the latter to provide the photo-current signal for the automatic sharp focusing. The diaphragm 27 consists of a nontransparent half 29, while the other half 30, which consists, for example, of frosted glass, causes incidence of diffused light on photo-cell 35, which serves as a criterion for the automatic adjustment of the magnitude of the light value. By means of pin 31 and tongue 32, swinging of diaphragm 26, 27, the contact 33 will be closed when the slit diaphragm 26 moves over photo-cell 35. If, however, diaphragm 27 moves over photo-cell 35, contact 34 will be closed by shifting tongue 32. Contacts 33 and 34 may consist of contact banks which are capable of switching several circuits simultaneously.

The herein described device for fully automatic sharp focusing of optical instruments can be constructed with regard to its electric components, such as amplifiers, filters, etc., with the use of vacuum tubes. This, however, would result in a relatively bulky construction, which would be perhaps practicable in stationary systems and laboratory or studio cameras, but is not suitable for other devices, e. g. amateur cameras. It is, therefore, contemplated according to the present invention, to use transistors instead of the vacuum tubes which not only reduces the dimensions, but also the weight and power consumption of the apparatus.

For the same reasons, it is contemplated to use selenium cells, or preferably germanium diodes, as rectifiers.

A further advantageous reduction in bulk and weight can be obtained by using, instead of more common photocells, photo-transistors. These latter units have the advantage that the current resulting from the action of light thereon can also be amplified in the same unit.

By using the above described steps and means, it is possible to house the complete system in a relatively small container which can be easily attached as a closed unit to a camera or another optical device.

Figure 17:
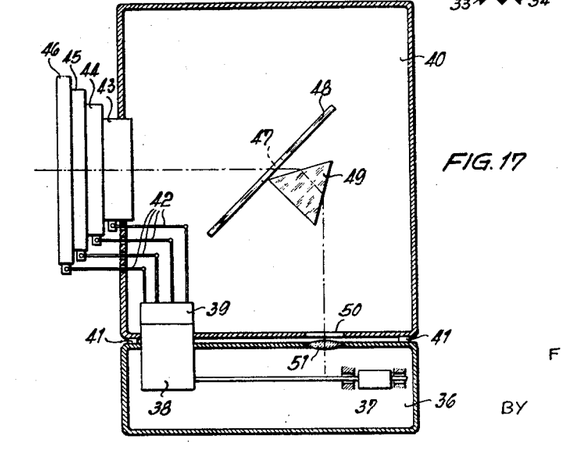
FIG. 17 is a somewhat simplified sectional view through a camera embodying the invention.

A preferred embodiment of the present invention is diagrammatically illustrated in FIG. 17. All of the components of the device described above are enclosed by the box-like container 36. In FIG. 17 the dimensions of container 36 correspond to the bottom surface of, for example, a reflex camera 40, to which it is removably applied so that container 36 rests on the seating surfaces 41. In container 36 only a driving motor 37 and a coupling assembly 38 are indicated. The latter includes the driving elements of all the couplings which transmit the adjusting forces to the objective. The mating driven elements of the couplings are arranged in a coupling assembly 39, which is fixedly arranged in camera 40. From here the adjusting elements 43, 44, 45 and 46 are displaced, for example by means of adjusting levers 42.

The beam of light incident through the objective in the camera must be deflected to the photoelectric organ of auxiliary device 36. According to the invention, this beam is directed for example through a window 47, which is semi-permeable to light, in finder mirror 48, then through a prism 49 arranged behind the window 47, through a window 50 in the bottom of the camera, and through a lens system 51 in container 36 and aligned with window 50. If the photoelectric organ should be at the same optical distance from the objective as the corresponding surface in the image plane, differences in length of rays can be compensated for, if necessary, by the lens system 51.

It will be understood that separate light paths can be provided for picture taking and for the automatic sharp focusing device, for example by means of two objectives, with the same results.

A control system, according to the invention, is described below. FIG. 9 illustrates a block diagram of the system, and FIG. 18 illustrates the wiring diagram of the system.

In FIGS 9 and 11, respectively, the following parts correspond to those in FIG. 18:

FIG. 9      FIG. 18

- Symbol 4 —— Z.
- Symbol 5 —— $T_1$; $T_2$ with $R_{1; 2; 3; 4}$ and $C_{1; 2; 3}$.
- Symbol 6 —— $K_{1; 2}$ with $T_3$ and $R_{1; 2; 3}$ and $C_4$.
- Symbol 7 —— $K_{3; 4}$ with $T_4$ and $R_{1; 2; 3}$ and $C_4$.
- Symbol 8 —— $D_1$.
- Symbol 9 —— $D_2$.
- Symbol 10 —— $C_5$ with $R_{5; 6; 7; 8}$.

FIG 11:      FIG. 18

- Symbol 17 —— $T_5$
- Symbol 18 —— $R_{11}$
- Symbol 16 —— $C_6$

The foregoing symbols of FIG. 18 and further symbols used therein have the following meaning:

- Z   Photo electric cell
- $K_1$, $K_2$   High frequency filter circuits
- $K_3$, $K_4$   Low frequency filter circuits
- $D_{1; 2}$   Germanium diodes
- $L_1$   Relay with back contact
- $L_2$   Differential relay
- T   Transistors
- V   Doubletriode
- $C_1$   Blocking condenser for the full operating potential
- $C_{2; 3}$   Ganged blocking condensers
- $C_4$   Coupling condenser for the rectifiers
- $C_5$   Charging condenser for the diodes
- $C_6$   Charging condenser of the time element $R_{11} \div C_6$
- $R_{1; 2; 3}$   Transistor bias resistors
- $R_4$   External working resistance
- $R_{5; 6}$   Ballast resistances for the diodes
- $R_{7; 8}$   Voltage divider
- $R_9$   External resistance for $T_5$
- $R_{10}$   Provides with $R_9$ a voltage divider supplying the operating potentials for the valve V
- $R_{11}$   Charging resistance for $C_6$
- $R_{12}$   Voltage divider for motor $M_1$
- $M_1$   Motor for moving the system of lenses
- $M_2$   Motor for oscillating the diaphragms
- $S_1$   Reversing switch for reversing motor $M_1$
- $S_2$   Main switch
- $P_{1; 2}$   Contacts of relay $L_2$ The operation of the system shown in FIG 18 may be explained in the light of two presumptions which are different in principle.

1st presumption: The shot taking system of lenses is directed against the free heaven and there is, therefore, no particular object.

In this case, only light at the fundamental frequency determined by the rate of operation of the slit shutter is directed onto photocell Z. The resultant current from the photocell is amplified in the transistors $T_1$ and $T_2$. However, this current is not applied to transistors $T_3$ and $T_4$ because the filter circuits $K_1$, $K_2$, $K_3$, and $K_4$ are not tuned to the frequency of this current. There is, therefore, no voltage applied across resistors $R_5$, $R_6$, $R_7$ and $R_8$. Consequently, there is no bias applied to transistor $T_5$ so that this transistor is non-conductive and no current flows through coil $L_1$ and resistor $R_9$. The armature of relay $L_1$ consequently remains in engagement with its back contact.

The motor reversing switch $S_1$, which is always engaged with one of its contacts, connects one grid of valve V to ground. The other grid, either through resistor $R_{11}$ or from the battery through voltage divider $R_9$—$R_{10}$, will have a negative biasing voltage applied thereto. Thus, the anodes of valve V and the coils of differential relay $L_2$ will carry different currents. Since this effects closure of one relay contact $P_1$ or $P_2$, the motor $M_1$ will operate to move the system of lenses in one direction to its limit of movement, at 1 m. or at infinity. The reversing switch is then changed over resulting in change over of the relay contacts $P_1$ and $P_2$ so that the motor is energized for operation in the reverse direction. The operation continues until the current is interrupted by opening of the main switch $S_2$.

The automatic device thus, in this case, does not set any definite range, as no object for shot taking exists.

2nd presumption: There is an object at a medium range, and the system of lenses is not set to it.

Initially, the automatic system for sharp focusing will operate exactly as described above. There will appear at the output of photocell Z, currents having the fundamental frequency (approximately 1000 cycles) and a spectrum of frequencies in which the low frequencies will be preponderant. These mixed frequency currents are amplified in transistors $T_1$ and $T_2$, and the amplified currents are then applied, through condenser $C_3$, to the filter circuits $K_1$ and $K_3$ in series. Filter circuit $K_1$, as well as filter circuits $K_2$ and $K_1'$, is tuned to the high frequency band (approximately 20,000 cycles). The filter circuits $K_3$, $K_4$, and $K_3'$ are tuned to the low frequency band (approximately 5,000 cycles).

The filter circuit $K_1$, which is connected as a parallel filter, has a very high resistance to the high frequency, whereas the filter circuit $K_2$, connected as a series filter, has a very low resistance to the high frequency currents. Therefore, the high frequency currents are applied to the transistor $T_3$ which has the high resistance filter $K_1'$ connected as a parallel filter. The high frequency currents amplified by transistor $T_3$ are applied, through condenser $C_4$, to diode $D_1$. In an analogous manner, the low frequency currents are applied to the diode $D_2$.

Diodes $D_1$ and $D_2$ are so connected, as may be seen from FIG. 18, that the sum of the rectified and amplified potential is applied across divider $R_5$ and $R_6$. The added potentials are then applied to the divider $R_7$ and $R_8$, whose center junction always has half the sum of the added potentials applied thereto. On the other hand, the respective voltages applied to resistors $R_5$ and $R_6$ correspond, respectively, to the values of the high frequencies and the low frequencies in the frequency spectrum.

By using the resistance network comprising the resistors $R_5$ and $R_6$ on the one hand, and the resistors $R_7$ and $R_8$ on the other hand, it is possible to produce a voltage corresponding to the voltage drop across resistor $R_5$ divided by the voltage drop across resistor $R_6$. This voltage is nearly independent of the amplitude of the respective high and low frequency currents. The foregoing is a simplified description of the production of a "quotient" voltage.

The transistor $T_5$ only conducts when its emitter is positive relative to its base. Relay coil $L_1$ will therefore not have any current flow therethrough, until the proportion of high frequencies begins to exceed that of the low frequencies in the view finding movement. When this occurs, current will flow through relay coil $L_1$ so that this relay coil will effect disengagement of its armature from the back contact, removing the ground from the emitter of transistor $T_5$. The view finding movement is thus changed into a lens or objective setting movement, due to the reversing switch $S_1$ being now disconnected at the back contact of relay $L_1$. The differential relay $L_2$ is no longer under the control of switch $S_1$ through the valve V. Valve V is now controlled by the rising current due to the high frequencies, which will impress on one grid of valve V a voltage different from that impressed on the other grid. The increasing voltage is directly applied to resistor $R_{10}$ and the right-hand grid of V. At the left-hand grid, however, only part of the voltage will appear, as the charging current of condenser $C_6$ will produce a voltage drop across resistor $R_{11}$. Only when the voltage across resistor $R_{10}$ no longer rises (or even drops), the charging current of condenser $C_6$ ($\approx 1\mu f.$) will become negligible and thus the voltage drop at resistor $R_{11}$ will also become negligible, so that both grids of V will have substantially the same voltage applied thereto. At such time, both contacts of relay $L_2$, viz. $P_1$ and $P_2$, are opened. The motor comes to a stop, and the fine focusing operation is finished.

The increase of the voltage at resistor $R_{10}$, however, is a measure of the proportion of high frequencies so that the motor always will be stopped as soon as the proportion of the high frequencies to the low frequencies arrives at its maximum. The suggested employment of a vacuum tube for this last stage is advisable, due to the possibility of grid control without current drain. If the charging of condenser $C_6$ should be disturbed by a current drain, which would be necessary for transistors, attainment of proper differentiation would be extremely difficult.

Figure 19:
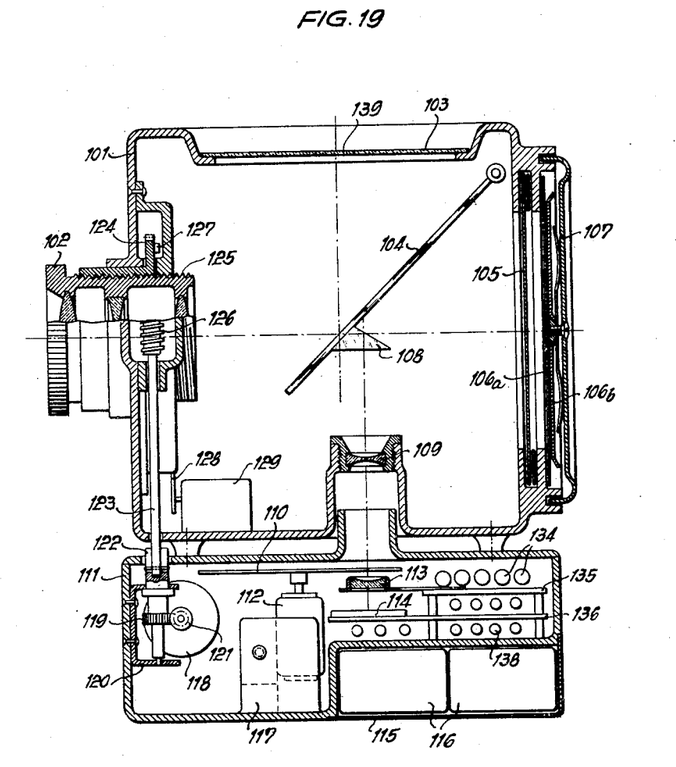
FIG. 19 is a sectional view through a camera embodying the invention.

The mechanical design is illustrated in FIG. 19. This figure shows a main section through a camera based on this invention. 101 is the body of the camera with the system of lenses 102, the ground glass screen 103, the mirror 104, the focal plane shutter 105, the film 106a with pressing plate 106b and the body back 107.

The illustrated camera is not the only one which can be equipped with the automatic sharp focusing device, but it is an example that shows the essential features of such a construction. The application of the automatic sharp focusing device to a camera requires the diverting, by means of suitable optical means, of a part of the light beam passing through the objective. In the illustrated example, this is effected by the prism 108, arranged at a half transparent portion of the mirror 104, the diverted light then passing through a lens 109 to the rotating diaphragm 110, mounted in the box shaped bottom part 111 on the shaft of the motor 112. The box shaped bottom part 111 contains all parts necessary for automatic sharp focusing. The focusing spot is the rotating diaphragm 110. From this focusing spot the light beam diverging after having passed the rotating diaphragm, is still more diffused by the lens 113 in order to light uniformly as large a surface as possible of the cell 114. The cast body 111 has a cavity for the battery 116, and this cavity can be closed by the cover 115. The bottom of the cast body 111 has a mounting bracket 117 supporting the motor 112 driving the rotating diaphragm 110. The lateral wall supports the motor 118 which moves the system of lenses. A pinion 119 rotatably mounted in the channel 120, which is fastened at the lateral wall of the body 111, is driven by the worm 121 of the motor 118. The pinion 119, by preference, is formed integral with the clutch 122 which drives the shaft 123 in the camera body through the medium of a pin connection; while the worm wheel 124, threadedly engaged with a thread 125 of the system of lenses, is driven by the worm 126 mounted on the shaft 123. On the worm wheel 124, a pin 127 is fixed which, as the worm wheel rotates, operates the finger 128 of the limit switch 129, having an operator projecting into the path of pin 127. This operation is effected, every time, in the extreme positions of the system of lenses, e.g. when focused on 1 m. and on ∞. The switch 129 is connected with the gear in the box 111 through switch pins and sockets which are not shown here. In FIG. 18, the corresponding switch is denoted by $S_1$.

Figure 20:
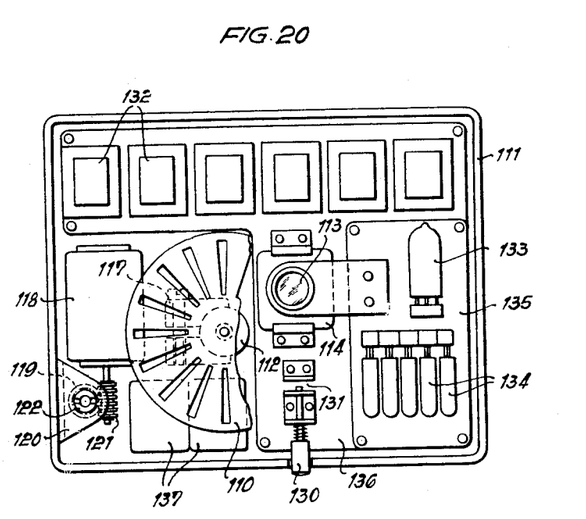
FIG. 20 is a top plan view of the attachment containing the control circuitry and adjusting elements.

FIG. 20 shows the top view of the box 111 with the cover removed to expose the diaphragm 110 rotating above the cell 114. At the lateral wall of the body 111, the push button 130 is mounted to close the switch 131. This switch, 131 is the main switch and it has been denoted by $S_2$ in FIG. 18. 132 are the coils of the ladder type filters, 133 the double triode valve, and 134 the transistors. Usually, the components are mounted on sheet bars 135 and 136 of Pertinax. The two relays 137 have been denoted in FIG. 18 by $L_1$ and $L_2$. The resistances and condensers of the system are located between or below the sheet bars 135 and 136, respectively, and are denoted by 138 in FIG. 19. The wiring of all parts corresponds to the wiring diagram of FIG. 18.

The automatic sharp focusing device is started by pushing the button 130 and switching on the main switch 131. Then the motor 118 rotates diaphragm 110. The sharp focused part of the image appearing on the ground glass screen 103 is inside a circular mark 139. This mark 139 limits a relatively very small angle of view which for systems of lenses with normal focus may be about 1/1600 steradian corresponding to a linear angle of view of ≈5°. When after focusing, the button 130 is pushed and, the camera is moved so that other parts of the view appear in the limited area 139, according to the description of the function of the system of FIG. 18, the system of lenses will be adjusted, until now this other angle of view will be sharply focused. It will always be possible to read the set range at the meter graduation of the system of lenses so that the automatic sharp focusing device, in a metaphorical sense, may be used also as a rangefinder. All known methods used in practical photography, such as focus selection, observation of depth of field and such like can be employed also with cameras provided with the automatic sharp focusing device according to my invention. As it will no longer be necessary to observe continually the sharp focusing operation, it will become possible to pay complete attention to the other factors important for taking a good picture.

The process and devices according to the present invention are not limited in their use to specific types of cameras. They can be used substantially in the same manner for sharp focusing of tele-, film, motion picture, studio-, laboratory-, reproducing and all kinds of amateur cameras. Furthermore, they can be used with considerable advantage in picture taking with telescopes, in the adjustment of base range finders and the like.

It will be, therefore, understood that this invention is not limited to the steps and details specifically described above and illustrated in the appended drawings and can be carried out with various modifications without departing from the scope of the invention as defined in the appended claims.

What is claimed is:

1. Apparatus for automatic sharp focusing of optical devices comprising a camera; an objective adjustably mounted in said camera for adjustment along its own axis to vary the sharpness of focusing; a photoelectric organ supported in relatively fixed relation to said objective; optical elements in said camera positioned and arranged to direct light entering through said objective onto said photoelectric organ; an opaque slit diaphragm positioned in the path of light directed onto said photoelectric organ; driving means connected to said diaphragm to move the latter to intermittently interrupt the light directed toward said photoelectric organ, said means producing in the photoelectric organ an output current having a characteristic wave shape varying with the sharpness of focusing of the objective and with the relative ratio of high frequency harmonics to low frequency harmonics varying in accordance with the wave shape in such manner that, at sharp focusing of the objective, the proportion of high frequency harmonics is much greater than the proportion of low frequency harmonics; filtering means connected to the output of said photoelectric organ and effective to separate the output current into two components, one containing a band of the high frequencies and the other containing a band of the low frequencies; comparison means connected to the output of said filtering means and effective to provide a control signal proportional to the quotient of the high frequency band component divided by the low frequency band component; servo mechanism connected to said objective to adjust the same along its axis; translating means connected between said comparison means and said servo mechanism for energizing the latter responsive to increasing values of said control signal to adjust said objective toward the position of sharp focusing; the control signal attaining a stable maximum value when the objective is in the position of sharp focusing, and said translating means de-energizing said servo mechanism when the control signal attains a stable maximum value.

2. Apparatus as claimed in claim 1 including an amplifier connected between said comparison means and said translating means.

3. Apparatus as claimed in claim 1 in which said photoelectric organ is arranged at substantially the same distance from said objective as the distance of the image plane of said objective from the latter, and is centered relative to the image projected thereon.

4. Apparatus as claimed in claim 1 in which the automatic sharp focusing components, except said objective and said optical elements, are mounted in a self-contained structural unit removably connected to said camera.

5. Apparatus as claimed in claim 1 in which said objective is mounted in an opening in one wall of the camera; and said optical elements include a prism arranged on the light axis of said objective and directing light passing through said objective toward a wall of the camera at right angles to the wall in which the objective is mounted, and a window in said latter wall aligned with said photoelectric organ.

6. Apparatus as claimed in claim 5, in which said prism is arranged behind a window of a finder mirror, said window being semi-permeable to light.

7. Apparatus as claimed in claim 5 in which said servo mechanism includes a driven element in the camera connected in operative relation to said objective, and a driving element in said structural unit; interengageable couplings on said driving and driven members operatively engaged upon mounting of said structural unit on the camera.

8. Apparatus as claimed in claim 1 in which said servo mechanism includes a reversible electric motor; reversing switch means in the energizing circuit of said reversible electric motor; and means coupled to said objective and operable to actuate said reversing switch means at each limit of the range of adjustment of said objective.

9. Apparatus as claimed in claim 1 in which said diaphragm is a rotatable disk; and an electric motor constituting said driving means and connected to said diaphragm to rotate the latter.

10. Apparatus as claimed in claim 1 including transistor amplifiers interposed between said photoelectric organ and said filtering means and between said filtering means and said comparison means.

11. Apparatus as claimed in claim 10 in which said transistor amplifiers comprise germanium triodes.

12. Apparatus as claimed in claim 1 in which said photoelectric organ is a photo-transistor.

13. Apparatus as claimed in claim 1 including light value adjusting means associated with said objective; a second servo mechanism connected to said light value adjusting means to operate the same; a second diaphragm connected in alternation with said opaque slit diaphragm and comprising alternating opaque and translucent sections for movement through the path of light directed toward said photoelectric organ in synchronism with said opaque slit diaphragm; and switching means operable by said diaphragms to respectively connect and disconnect the two servo mechanisms to said translating means in accordance with the respective one of said two diaphragms then in the path of light directed toward said photoelectric organ.

14. Apparatus as claimed in claim 1 in which, when there are several objects in the field of view of the objective, with the objective thus having positions of sharp focusing corresponding to each object and said comparison means producing control currents each corresponding to one of said positions, said comparison means controls said servo mechanism through said translating means to adjust said objective to a position centered between the two such positions of sharp focusing nearest the two limits of the range of adjustment of said objective.

References Cited in the file of this patent

UNITED STATES PATENTS

| | | |
|---|---|---|
| 1,866,581 | Simjian | July 12, 1932 |
| 2,134,757 | Goldsmith | Nov. 1, 1938 |
| 2,403,628 | Beers | July 9, 1946 |
| 2,524,807 | Kallmann | Oct. 10, 1950 |
| 2,655,848 | Gray | Oct. 20, 1953 |
| 2,699,834 | O'Brien | Jan. 18, 1955 |
| 2,831,057 | Orthuber | Apr. 15, 1958 |
| 2,838,600 | Salinger | June 10, 1958 |